United States Patent [19]

Selbeck et al.

[11] 4,001,348

[45] Jan. 4, 1977

[54] UNSATURATED POLYESTER RESINS CONTAINING ADDITIONAL ACCELERATORS

[75] Inventors: Harald Selbeck, Krefeld-Gartenstadt; Rolf Dhein, Krefeld-Bockum; Hans Rudolph, Krefeld; Manfred Patheiger, Krefeld; Otto Bendszus, Krefeld, all of Germany

[73] Assignee: Bayer Aktiengesellschaft, Germany

[22] Filed: Nov. 11, 1975

[21] Appl. No.: 630,938

[30] Foreign Application Priority Data

Nov. 15, 1974 Germany .................... 2454325

[52] U.S. Cl. .................. 260/864; 260/28 R; 260/78.41; 260/863; 260/865; 260/866; 260/867; 526/204; 526/208; 526/271; 526/272; 526/321; 526/324; 526/325

[51] Int. Cl.² ............... C08L 67/06; C08K 5/04

[58] Field of Search .......... 260/28, 78.4 A, 78.4 E, 260/78.4 UA, 89.5 R, 89.5 A, 863, 864, 865, 866, 867

[56] References Cited

UNITED STATES PATENTS

| | | | |
|---|---|---|---|
| 3,313,864 | 4/1967 | Rudolph et al. | 260/864 |
| 3,484,410 | 12/1969 | Rudolph et al. | 260/864 X |
| 3,548,029 | 12/1970 | Stahly et al. | 260/864 |
| 3,553,292 | 1/1971 | Stahly et al. | 260/864 |
| 3,553,293 | 1/1971 | Stahly et al. | 260/864 X |
| 3,914,200 | 10/1975 | Oswitch et al. | 260/864 X |

OTHER PUBLICATIONS

Chem. Abs. 57:16783a, 57:P10034g, 58.P1553a, 59:P11687c, 65:PC20300e, 68:P51046f, 71:102286f, 75:P21736h, 75:P64974b.

Primary Examiner—Murray Tillman
Assistant Examiner—T. DeBenedictis, Sr.
Attorney, Agent, or Firm—Connolly and Hutz

[57] ABSTRACT

Polyester moulding and coating compositions based on polyester resins of:

A. from 20 to 90% by weight based on the sum of components (A) and (B), of α,β-ethylenically unsaturated polyesters, and B. from 80 to 10% by weight based on the sum of components (A) and (B) of polymerizable compounds, these polyester compositions containing, in addition to possible further additives, C. from 0.1 to 8.0% by weight based on the sum of components (A) and (B) of polymerization initiators, D. from 0.001 to 0.1% by weight based on the sum of components (A) and (B) of polymerization inhibitors, E. from 0.001 to 0.5% by weight, based on the sum of components (A) and (B), of conventional accelerators, F. from 0.05 to 5.0% by weight based on the sum of components (A) and (B) of additional accelerators, and optionally, G. from 0.01 to 1.0% by weight based on the sum of components (A) and (B) of paraffin or wax-like substances, wherein the additional accelerators (F) are compounds corresponding to the following general formula:

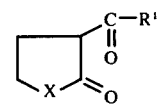

wherein

X represents O, S, or preferably $NR^2$, $R^1$ represents an aliphatic radical having from 1 to 8 carbon atoms, hydroxyl, $-NR^4R^5$, cyclohexyl, cyclopentyl, alkoxy having from 1 to 4 carbon atoms or $-COOR^3$, $R^2$ represents an aliphatic radical having from 1 to 8 carbon atoms, a cycloaliphatic radical having from 5 to 8 carbon atoms, acetyl, benzoyl, benzyl, $R^3$ represents a hydrogen atom or an aliphatic radical having from 1 to 8 carbon atoms, or an aromatic radical, such as the phenyl radical or an aliphatically-substituted phenyl radical, the aliphatic radical containing from 1 to 4 carbon atoms, $R^4$ and $R^5$ each represent a hydrogen atom, an aliphatic radical having from 1 to 4 carbon atoms, phenyl, cyclohexyl, or $R^4$ and $R^5$ together represent a cycloaliphatic radical having from 4 to 8 carbon atoms.

7 Claims, No Drawings

UNSATURATED POLYESTER RESINS CONTAINING ADDITIONAL ACCELERATORS

This invention relates to unsaturated polyester resins which, in addition to radical-formers, accelerators and, optionally, other convention additives, contain certain additional accelerators (promoters).

Lacquer coatings based on paraffin-containing unsaturated polyester resins dry in three stages which may be defined as follows: 1) initial gelation step, 2) paraffin separation step and 3) paraffin hardening step (in this step the paraffin separated off becomes fast to wiping.) The paraffin separation stage, i.e. the formation of a layer of paraffin on the surface of the lacquer, is of particular practical importance as it protects the lacquer layer against the inhibiting affect of atmospheric oxygen. After this layer of paraffin has been formed, the lacquer may if desired be heat-dried.

The third stage of the drying process the paraffin hardening step resulting in wiping resistance is finished of the paraffin layer when the layer of lacquer has dried to such an extent that the lacquered articles can be stacked without damage to the lacquer. Thereafter, it is possible, for example, to lacquer the reverse side of the lacquered articles.

It is known that $\beta$-dicarbonyl compounds, such as acetoacetic acid esters (DT-OS No. 1,694,099, acetyl acetone (Duetsche Farbenzeitschrift 14, No. 11 (1960), 422), benzoyl acetone, acetyl cyclopentanone (DT-OS No. 1,927,320) or N-substituted acetoacetic acid amides (DT-AS No. 1,195,491) are suitable for use as promoters. Polyester compositions containing these compounds harden quickly at temperatures as low as room temperature.

Since, in the lacquering art, shortened cycle times provide for an increase in throughput, there is a need to shorten the hardeing times further.

One requirement which additional accelerators have to satisfy is that they should develop their full effect even in samll quantities because, when used in relatively large quantities in the form of compounds which generally cannot be co-condensed, they may have a negative effect upon the properties of the hardened lacquer layers. Another requirement which additional accelerators have to satisfy is that, despite their accelerating effect, they should not shorten the shelf-life of the polyester compositions to any significant extent. Another requirement is that they should be readily soluble in the polyester resins, thereby eliminating the need for auxiliary solvents.

The present invention is based on the discovery that certain derivatives of 2-pyrrolidone, $\gamma$-butyrolacetone and 1-thia-2-cyclpentanone are effective additional accelerators.

The present invention relates to polyester moulding compositions and coating compositions based on polyester resins of:

A. from 20 to 90 %, by weight preferably from 40 to 70 %, by weight based on the sum of components (A) and (B), of $\alpha,\beta$-ethylenically unsaturated polyesters, and B. from 80 to 10 % by weight preferably from 60 to 30 %, by weight, based on the sum of components (A) and (B), of polymerisable compounds, these polyester compositions containing, in addition to other possible additives, C. from 0.1 to 8.0 %, by weight, preferably from 0.3 to 5.0 %, by weight, based on the sum of components (A) and (B), of polymerisation initiators, D. from 0.001 to 0.1 %, by weight, preferably from 0.01 to 0.05 %, by weight, based on the sum of components (A) and (B), of inhibitors, E. from 0.001 to 0.5 %, by weight, preferably from 0.01 to 0.1 %, by weight, based on the sum of components (A) and (B), of conventional accelerators, F. from 0.05 to 5.0 %, by weight, preferably from 0.1 to 1.5 %, by weight, based on the sum of components (A) and (B), of additional accelerators, and optionally G. from 0.01 to 1.0 %, by weight, preferably from 0.03 to 0.3 %, by weight, based on the sum of components (A) and (B), of paraffin or wax-like substances, characterised in that the additional accelerators (F) are compounds corresponding to the following general formula:

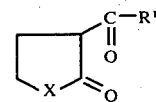

wherein

X represents O, S, or preferably, $NR^2$, $R^1$ represents an aliphatic radical having from 1 to 8 carbon atoms, hydroxyl, $-NR^4R^5$, cyclohexyl, cyclopentyl or alkoxy having from 1 to 4 carbon atoms, preferably $-CH_3$ or $-COOR^3$, $R^2$ represents an aliphatic radical having from 1 to 8 carbon atoms, a cycloaliphatic radical having from 5 to 8 carbon atoms, acetyl, benzoyl, or benzyl, preferably hydrogen or $-CH_3$, $R^3$ represents hydrogen, an aliphatic radical having from 1 to 8 carbon atoms or an aromatic radical such as the phenyl radical, or an aliphatically-substituted phenyl radical, the aliphatic radical containing from 1 to 4 carbon atoms, $R^4$ and $R^5$ each represent a hydrogen atom, an aliphatic radical having from 1 to 4 carbon atoms, phenyl, cyclohexyl or $R^4$ and $R^5$ together represent an aliphatic radical having from 4 to 8 carbon atoms.

Particularly active compounds are the compounds derived from 2-pyrrolidone, for example 3-acetyl-2-pyrrolidone, N-methyl-3-acetyl-2-pyrrolidone, N-metnyl-3-oxalo-2-pyrrolidone and N-methyl-3-ethoxalyl-2-pyrrolidone.

The unsaturated polyesters (A) used in accordance with the present invention may be obtained in conventional manner by the polycondensation of at least one $\alpha,\beta$-ethylenically unsaturated dicarboxylic acid or an ester-forming derivative thereof, optionally in admixture with up to 90 mol %, based on the unsaturated acid component, of at least one aliphatic unsaturated, optionally aromatic or cycloaliphatic, dicarboxylic acid or an ester-forming derivative thereof, with at least one dihydric alcohol (cf. also J. Bjorksten et al, "Polyesters and the Applications", Reinhold Publishing Corp., New York, 1956).

Examples of preferred unsaturated dicarboxylic acids or their derivatives are maleic acid or maleic acid anhydride and fumaric acid. However, it is also possible to use, for example, mesaconic acid, citraconic acid, itaconic acid or chloromaleic acid. Examples of the aliphatic saturated, aromatic or cycloaliphatic dicarboxylic acids used, or derivatives thereof, are phthalic acid or phthalic acid anhydride, isophthalic acid, terephthalic acid, hexahydrophthalic acid or tetrahydrophthalic acid or anhydrides thereof, endomethylene tetrahydrophthalic acid or the anhydride thereof, succinic acid or succinic acid anhydride and succinic acid esters and chlorides, adipic acid and sebacic acid. In order to produce substantially non-inflammable resins, it is possible to use, for example, hexachloroendomethylene tetrahydrophthalic acid (HET-acid), tetrachlorophthalic acid or tetrabromophthalic acid. Preferred polyesters contain maleic acid radicals of which up to 25 mol % may be replaced by phthalic acid or isophthalic acid radicals. Suitable dihydric alcohols are those containing from 2 to 15 carbon atoms, such as ehtylene glycol, 1,2-propane diol, 1,3-propane diol, diethylene glycol, dipropylene glycol, 1,3-butane diol, 1,4-butane diol, neopentyl glycol, 1,6-hexane diol and perhydrobisphenol. It is preferred to use ethylene glycol, 1,2-propane diol, diethylene glycol and dipropylene glycol. Further modifications are possible by the incorporation of up to 10 mol %, based on the alcohol or acid component, of monohydric and polyhydric alcohols, such as butanol, benzyl alcohol, cyclohexanol and tetrahydrofurfuryl alcohol, trimethylol propane and pentaerythritol, and by the incorporation of monobasic acids, such as benzoic acid, t-butyl benzoic acid, oleic acid, linseed oil fatty acid and ricinene fatty acid.

The polyesters should preferably have acid numbers of from 5 to 100, preferably from 20 to 60, OH-numbers of from 10 to 100, preferably from 20 to 60 and viscosities of from 500 to 3000, preferably from 700 to 2000 cP, as measured on a 65 % by weight solution styrene at 20° C.

Polymerisable compounds suitable for use in accordance with the present invention are the unsaturated compounds commonly used in polyester chemistry, i.e. preferably $\alpha$-substituted vinyl or $\beta$-substituted allyl compounds, preferably styrene. However, it is also possible to use, for example, nucleus-chlorinated, nucleus-alkenylated and nucleus-alkylated styrenes, the alkenyl or alkyl groups containing from 1 to 4 carbon atoms, such as vinyl toluene, divinyl benzene, $\alpha$-methyl styrene, t-butyl styrene, chlorostyrenes; vinyl esters of carboxylic acids having from 2 to 6 carbon atoms, preferably vinyl acetate; vinyl pyrrolidone, vinyl pyridine, vinyl naphthalene, vinyl cyclohexane, acrylic acid and methacrylic acid and/or the esters thereof having from 1 to 4 carbon atoms in the alcohol component, the amides and nitriles thereof, maleic acid anhydride, -semi-esters and -diesters having from 1 to 4 carbon atoms in the alcohol component, -semi-amides and -diamides or cyclic imides, such as N-methyl maleic imide or N-cyclohexyl maleic imide; allyl compounds, such as allyl benzene, and allyl esters, such as allyl acetate, allyl acrylate, allyl methacrylate, phthalic acid diallyl ester, isophthalic acid diallyl ester, fumaric acid diallyl ester, allyl carbonates, diallyl carbonates, triallyl phosphate and triallyl cyanurate.

Suitable polymerisation initiators are, for example, diacyl peroxides, such as diacetyl peroxide, dibenzoyl peroxide, di-p-chlorobenzoyl peroxide, dilauroyl peroxide, peroxy esters, such as t-butyl peroxyacetate, t-butyl peroxybenzoate, dicyclohexyl peroxy dicarbonate, alkyl peroxides, such as bis-(t-butyl peroxybutane), dicumyl peroxide, t-butyl cumyl peroxide, hydroperoxides, such as cumene hydroperoxide, t-butyl hydroperoxide, cyclohexanone hydroperoxide, methylethyl ketone hydroperoxide, ketone peroxides, such as cyclohexanone peroxide, acetyl acetone peroxide or azoisobutyrodinitrile.

Other suitable polymerisation initiators are the conventional photosensitizers, more especially of the benzophenone and benzoin derivative type, for example aromatic disulphides, 2-phenyl acetophenones, silyl ethers of tetraaryl-1-1,2-glycols, $\gamma$-$\delta$-diphenyl butyric acid derivatives, thiomethylated and halomethylated benzophenones, valeric acids derived from benzoin or from benzoin ethers, and the salts thereof, benzoic aryl and silyl ether compounds of the type described in German Pat. No. 1,233,594 and in German Offenlegungsschrift Nos. 1,769,168; 2,164,482; 1,807,301; 2,155,000; 1,949,010; 2,022,507; 1,769,576 and 1,902,051; but preferably benzoin ethers of primary and secondary alcohols, substituted benzoins, benzoin ethers and esters of the type described, for example, in German Auslegeschrift Nos. 1,902,930 and 1,694,149 and in German Offenlegungsschrift Nos. 1,769,853 and 1,769,854.

The polyester compositions according to the present invention contain conventional polymerisation inhibitors, which prevent premature uncontrolled gelation, in the conventional quantities, i.e. in quantities of from 0.001 to 0.1 %, by weight. Suitable polymerisation inhibitors of this type are phenols and phenol derivatives, preferably sterically hindered phenols with alkyl substituents containing from 1 to 6 carbon atoms in both o-positions to the phenolic hydroxy group, amines, preferably secondary aryl amines and derivatives thereof, quinones, copper salts of organic acids, addition compounds of CU(I)-halides with phosphites, such as 4,4'-bis-(2,6-di-t-butyl phenol), 1,3,5-trimethyl-2,4,6-tris-(3,5-di-t-butyl-4-hydroxy benzyl)-benzene, 4,4'-butylidene-bis-(6-t-butyl-n-cresol), 3,5-di-t-butyl-4-hydroxybenzyl phosphonic acid diethyl ester, N,N'-bis-($\beta$-naphthyl)-p-phenylene diamine, N,N'-bis-(1-methylheptyl)-p-phenylene diamine, phenyl-$\beta$-naphthyl amine, 4,4'-bis-($\alpha$,$\alpha$-dimethylbenzyl)-diphenyl amine, 1,3,5-tris-(3,5--di-t-butyl-4-hydroxy hydrocinnamoyl)hexahydro-s-triazine, hydroquinone, p-benzoquinone, toluhydroquinone, p-t-butyl pyrocatechol, chloranil, naphthoquinone, copper naphthenate, copper octoate, CU(I)Cl/triphenyl phosphite, Cu-(I)Cl/trimethyl phosphite, CU(I)Cl/tris-chloroethylphosphite, Cu(I)Cl/tripropyl phosphite and p-nitrosodimethyl aniline.

Suitable conventional accelerators (E) are compounds which are known to be active in this direction, such as mercaptans and sulphinic acids, for example dodecyl and lauryl mercaptan, p-toluene and benzene sulphinic acids, also dialkyl aryl amines, for example dimethyl and diethyl aniline, which may optionally be substituted in the p-positions by phenyl, methyl, methoxy, hydroxyl or amino radicals. In cases where these amines contain functional groups capable of esterification or copolymerisation, such as N,N-bis-[$\beta$-hydroxyethyl]-aniline, they may also be incorporated into the polyesters. Preferred accelerators are the heavy metal salts of carboxylic acids, such as vanadium, iron, manganese naphthalates and octoates, but especially cobalt naphthenates and octoates. It is, of course, also possible to use mixtures of the above-mentioned accelerators. Thus, combinations of cobalt salt accelerators and dialkyl aryl amines have proved to be particularly effective.

The additional accelerators (F) used according to the present invention may be produced by the methods described in Chem. Ber. 90, 1290 (1957); ibid. 95, 2424, 2444 (1962), J. Chem. Soc. (London) (C) 1971, 999, Chem. Abstracts 52, 11904 f (1958) or by similar methods. In addition to good solubility in polyester resins, they have the particular advantage of being highly active even in small quantities, and of not shortening shelf-life to any appreciable extent despite their high reactivity. Not only do they shorten the time elapsing before the separation of paraffin begins, paraffin hardening step is also reached much earlier.

It has been found that hardening of the polyester compositions according to the present invention may be further accelerated by means of known additives used in quantities of from 0.1 to 10 %, by weight, based on the sum of components (A) and (B). Suitable additives of this type are aliphatic, cycloaliphatic and aromatic tertiary phosphones having up to 12 carbon atoms per organic radical, such as triphenyl phosphine, tricyclohexyl phosphine and tri-n-butyl phosphine, aromatic phosphites having up to 12 carbon atoms per aryl radical, such as triphenyl phosphite, tri-(2-biphenyl)-phosphite, but more especially organic sulphur compounds according to DT-PS No. 1,262,595, such as thioethers, for example thiodiglycol.

By virtue of its hydroxyl or carboxyl groups, for example, thiodigylcol may even be directly incorporated into the unsaturated polyester resin.

In general, the accelerators (E) and additional accelerators (F) are added separately. In cases where a complex may be formed between the additional accelerator (F) and the accelerator (E), especially when the latter contains cobalt in transition metal form, it is generally advantageous to add the complex either in isolated form or in solution. Hardening begins with addition of the polymerisation initiators (C), accelerators (E) and additional accelerators (F). It goes without saying that the initiators (C) and accelerators (E) cannot be mixed with one another on account of the danger of explosion, but instead have to be separately added to the polyester resins.

Other suitable additives are, for example, antigreening agents, such as phosphoric acid, phosphoric acid mono-n-butyl ester, phosphoric acid-di-n-butyl ester.

The invention is illustrated by the following Examples in which the parts and percentages quoted represent parts and percent by weight. EXAMPLES
Polyester resin (I):

797 parts of 1,2-propane diol, 608 parts of maleic acid anhydride and 562 parts of phthalic acid anhydride were reacted under a nitrogen atmosphere at 180° C until an acid number of 45 had been reached. A 65 % solution of this polyester in styrene had a viscosity of 1350 cP, as measured at 20° C.

55 parts of the polyester obtained were dissolved in 45 parts of styrene and stabilised with 0.01 part of toluhydroquinone.
Polyester resin (II):

765 parts of 1,2-propane diol, 54 parts of thiodiglycol, 608 parts of maleic acid anhydride and 562 parts of phthalic acid anhydride were reacted under nitrogen at 180° C until an acid number of 48 had been reached. A 65 % solution of this polyester in styrene had a viscosity of 1420 cP, as measured at 20° C.

The thus-obtained polyester was dissolved in styrene and stabilised in the same way as polyester resin (I).

EXAMPLE 1

0.03 parts of cobalt, in the form of a cobalt octoate solution in toluene with a 2.2 % metal content, 0.1 part of paraffin (m.p. 51°–53° C), in the form of a 10 % solution in toluene, and the additional accelerators identified in Table 1 below, were added to batches of 100 parts of polyester (I). The mixtures were applied to glass plates in a wet-film layer thickness of approximately 500 μ using a film-casting apparatus. The glass plates had been previously coated with 100 g/m² of active primer consisting of 30 parts of nitrocellulose (butanolmoist), 80 parts of ethyl acetate, 45 parts of butyl acetate, 60 parts of toluene; 20 parts of cyclohexanone peroxide powder (90%) and 8 parts of cyclohexanone peroxide paste (50%).

Table 1

| Additional accelerator according to the present invention: | % based on polyester resin (I) | Beginning of paraffin separation (minutes) |
|---|---|---|
| N-methyl-3-ethoxalyl 2-pyrrolidone | 0.5 | 13 |
| N-methyl-3-oxalo-2-pyrrolidone | 0.5 | 13 |
| N-methyl-3-acetyl-2-pyrrolidone | 0.5 | 13 |
| 3-acetyl-2-pyrrolidone | 0.5 | 14 |
| Conventional addition accelerator | | |
| No addition (standard) | — | 27 |
| Acetoacetic acid ethyl ester | 0.5 | 25 |
| Acetoacetic acid glycol ester | 0.5 | 24 |
| Acetyl acetone | 0.5 | 21 |
| Triacetyl methane | 0.5 | 25 |
| Acetoacetic acid-N-benzyl amide | 0.5 | 17 |
| 2-acetyl cyclopentanone | 0.5 | 17 |

EXAMPLE 2

The procedure was as in Example 1, except that the additional accelerators of Table 1 were replaced by those identified in Table 2.

Table 2

| Additional accelerator according to the present invention in %, based on polyester resin (I) | | Organophosphorus or organosulphur compounds in %, based on polyester resin (I) | | Beginning of paraffin separation (minutes) |
|---|---|---|---|---|
| N-methyl-3-ethoxalyl-2-pyrrolidone | 0.5 | triphenyl-phosphite | 0.3 | 10 |
| '' | 0.5 | thiodiglycol | 0.3 | 11 |
| '' | 0.5 | triphenyl-phosphine | 0.3 | 12 |
| N-methyl-3-acetyl-2-pyrrolidone | 0.5 | triphenyl-phosphite | 0.3 | 12 |
| α-ethoxalyl-γ-butyrolactone | 0.5 | thiodiglycol | 0.3 | 12 |

EXAMPLE 3

The procedure was as in Example 1, except that polyester resin (I) was replaced by polyester resin (II) and the additional accelerators of Table 1 were replaced by the additional accelerators identified in Table 3.

Table 3

| Additional accelerator according to the present invention in %, based on polyester resin (II) | | Beginning of paraffin separation (minutes) |
|---|---|---|
| N-methyl-3-ethoxalyl-2-pyrrolidone | 0.5 | 9 |
| N-methyl-3-oxalo-2-pyrrolidone | 0.5 | 11 |
| α-acetyl-γ-butyrolactone | 0.5 | 12 |
| α-ethoxalyl-γ-butyrolactone | 0.5 | 13 |
| 3-ethoxalyl-1-thia-2-cyclopentanone | 0.5 | 12 |

We claim

1. A composition comprising:
   A. from 20 to 90 %, by weight, based on the sum of components (A) and (B), of at least one α,β-ethylenically unsaturated polyester;
   B. from 80 to 10 %, by weight, based on the sum of components (A) and (B), of at least one polymerisable ethylenically unsaturated compound;
   C. from 0.1 to 8.0 %, by weight, based on the sum of components (A) and (B), of at least one polymerisation initiator;
   D. from 0.001 to 0.1 %, by weight, based on the sum of components (A) and (B), of at least one polymerisation inhibitors;
   E. from 0.001 to 0.5 %, by weight, based on the sum of components (A) and (B), of at least one accelerator; and
   F. from 0.05 to 5.0 %, by weight, based on the sum of component (A) and (B) of at least one compound corresponding to the followng general formula:

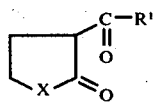

wherein
X represents O, S or >NR$^2$

R$^1$ represents a C$_1$–C$_8$ aliphatic radical, —OH, —NR$^4$R$^5$, cyclohexyl, cyclopentyl, a C$_1$–C$_4$ alkoxy radical or —COOR$^3$,
R$^2$ represents a hydrogen atom, a C$_1$–C$_8$ aliphatic radical a C$_5$–C$_8$ cycloaliphatic radical, acetyl, benzoyl or benzyl,
R$^3$ represents a hydrogen atom, a C$_1$–C$_8$ aliphatic radical or an optionally substituted aromatic radical,
R$^4$ and R$^5$ which may be the same or different, each represents a hydrogen atom, a C$_1$–C$_4$ aliphatic radical, phenyl or cyclohexyl or R$^4$ and R$^5$ taken together represent a C$_4$–C$_8$ cycloaliphatic radical.

2. A composition as claimed in claim 1 which additionally comprises:
   G. from 0.01 to 1.0 %, by weight, based on the sum of components (A) and (B), of at least one paraffin or wax-like substance.

3. A composition as claimed in claim 2 which comprises:
   from 40 to 70 % by weight, component (A),
   from 60 to 30 % by weight, component (B),
   from 0.3 to 5 % by weight, component (C),
   from 0.01 to 0.05 %, by weight, component (D),
   from 0.01 to 0.1 %, by weight, component (E),
   from 0.1 to 1.5 %, by weight, component (F),
   and from 0.03 to 0.3 %, by weight, component (G).

4. A composition as claimed in claim 1 in which component (F) is selected from 3-acetyl-2-pyrrolidone, N-methyl-3-acetyl-2-pyrrolidone, N-methyl-3-oxalo-2-pyrrolidone and N-methyl-3-ethoxalyl -2-pyrrolidone.

5. A composition as claimed in claim 1 which additionally comprises from 1 to 10 % by weight based on the sum of components (A) and (B), of conventional additives selected from aliphatic, cycloaliphatic or aromatic phosphines having up to 12 carbon atoms per organic radical, aromatic phosphites having up to 12 carbon atoms per aryl radical and organic sulphur compounds.

6. A composition as claimed in claim 5 in which the conventional additives are selected from triphenyl phosphine, tricyclohexyl, phosphine, tri-n-butyl phosphine triphenyl phosphite, tri-(2-biphenyl)-phosphite and thiodiglycol.

7. An article moulded from or coated with a composition as claimed in claim 1.

* * * * *